(12) United States Patent
Huang et al.

(10) Patent No.: US 7,971,866 B2
(45) Date of Patent: Jul. 5, 2011

(54) SHEET-FEEDING SCANNING APPARATUS HAVING MECHANISM FOR FEEDING BUSINESS CARD

(75) Inventors: Wen-An Huang, Taipei (TW); Chung-Kai Wang, Taipei (TW); Wei-Hsun Hsu, Taipei (TW); Chao-Min Yang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 259 days.

(21) Appl. No.: 12/205,475

(22) Filed: Sep. 5, 2008

(65) Prior Publication Data
US 2010/0014128 A1    Jan. 21, 2010

(30) Foreign Application Priority Data
Jul. 18, 2008    (TW) .............................. 97127262 A

(51) Int. Cl.
*B65H 1/04*    (2006.01)
(52) U.S. Cl. ..................... 271/9.01; 271/9.08; 271/9.09; 271/127
(58) Field of Classification Search ................. 271/9.01, 271/9.05, 9.06, 9.08, 9.09, 126, 127, 160, 271/167, 117, 121; 358/498, 496; 399/367, 399/369
See application file for complete search history.

(56) References Cited

U.S. PATENT DOCUMENTS

| | | | | |
|---|---|---|---|---|
| 4,487,406 A * | 12/1984 | Kabashima | .................... | 271/127 |
| 4,582,314 A * | 4/1986 | Yamamoto et al. | ........... | 271/127 |
| 4,838,535 A * | 6/1989 | Yokoi et al. | ...................... | 271/22 |
| 5,615,873 A * | 4/1997 | Kobayashi et al. | ........... | 271/121 |
| 5,768,448 A * | 6/1998 | Ichinose | ........................ | 382/312 |
| 5,969,831 A * | 10/1999 | Ichinose | ........................ | 358/498 |
| 6,313,930 B1 * | 11/2001 | Oshima et al. | ................. | 358/498 |
| 6,540,221 B2 * | 4/2003 | Nakashima et al. | .......... | 271/121 |
| 6,644,648 B1 * | 11/2003 | Goode | .......................... | 271/125 |
| 6,738,167 B1 * | 5/2004 | Suzuki | .......................... | 358/498 |
| 7,040,614 B2 * | 5/2006 | Sonoda et al. | ................. | 271/125 |
| 7,147,219 B2 * | 12/2006 | Soo | .................................. | 271/157 |
| 7,497,434 B2 * | 3/2009 | Park | ............................... | 271/127 |
| 7,547,011 B2 * | 6/2009 | Kurata et al. | ................. | 271/9.11 |
| 7,618,036 B2 * | 11/2009 | Ikeda | ............................. | 271/121 |
| 7,624,979 B2 * | 12/2009 | Masutani | ....................... | 271/167 |
| 7,648,134 B2 * | 1/2010 | Lim | ................................. | 271/118 |
| 7,668,501 B2 * | 2/2010 | Murakami et al. | ............. | 399/392 |
| 2004/0124578 A1 * | 7/2004 | Shin et al. | ...................... | 271/126 |
| 2004/0178563 A1 * | 9/2004 | Tsuchida | ....................... | 271/126 |
| 2009/0224460 A1 * | 9/2009 | Kurata et al. | ................. | 271/9.01 |
| 2010/0007931 A1 * | 1/2010 | Wang et al. | .................... | 358/498 |

* cited by examiner

Primary Examiner — Kaitlin S Joerger
(74) Attorney, Agent, or Firm — Kirton & McConkie; Evan R. Witt

(57) ABSTRACT

A sheet-feeding scanning apparatus having a business card feeding mechanism is provided. The sheet-feeding scanning apparatus includes a scanning module, an ordinary document input tray, an ordinary document pick-up roller assembly, an ejecting tray, a transfer channel, a plurality of transfer rollers, a business card input tray, and a business card pick-up roller assembly. The business card input tray has a business card support plate. In a case that a jam event occurs, the business card support plate may be swung for facilitating removing the jammed business card.

3 Claims, 3 Drawing Sheets

SHEET-FEEDING SCANNING APPARATUS HAVING MECHANISM FOR FEEDING BUSINESS CARD

FIELD OF THE INVENTION

The present invention relates to a scanning apparatus, and more particularly to a sheet-feeding scanning apparatus having a mechanism for feeding a business card or an ordinary document.

BACKGROUND OF THE INVENTION

Scanning apparatuses are widely used for scanning images of documents, photographs or films. The scanned images can be converted into electronic files, which are then stored, processed or spread. With increasing development of scanning technologies, the scanning apparatuses have experienced great growth and are now rapidly gaining in popularity.

In the early stage, the scanning apparatus can scan one side of the document. For scanning both sides of the document, after one side of the document has been scanned, the document should be manually turned over so as to scan the other side of the document. However, the process of manually turning over the document is troublesome. Recently, an automatic document feeder is usually integrated into the scanning apparatus. After a stack of documents to be scanned are placed on the sheet input tray of the automatic document feeder, the sheet-feeding mechanism of the automatic document feeder will successively transport the paper to perform the scanning operation without the need of manually turning over the documents. This means of automatically feeding the paper sheets is both time-saving and efficient. It is found that the scanning apparatuses are improved according to the generation development and the diverse demands.

On basis of business affairs' demand, business cards are frequently used to provide potential customers with a means to contact the business. After the business cards are accumulated to a large amount, the basic information associated with the business cards is manually searched. This manual searching approach is very troublesome. For a purpose of quickly searching the basic information associated with the business cards and saving the collecting space, the business cards are usually scanned as electronic files, which are then stored and managed. As known, the use of the conventional scanning apparatus to scan the business cards incurs drawbacks when both sides of a business card are scanned. In other words, after one side of the business card has been scanned, the business card should be manually turned over so as to scan the other side of the business card. The process of manually turning over the business card is troublesome especially when business cards are accumulated to a large amount. For convenience, the user prefers using a sheet-feeding scanning apparatus with the automatic document feeder to scan the business cards.

During operation of the sheet-feeding scanning apparatus, the sheet-like document is readily jammed in an internal portion of the sheet-feeding scanning apparatus. When a jam event occurs, the majority of the sheet-like document is stuck in the internal channel of the sheet-feeding scanning apparatus but the rear terminal of the sheet-like document is still exposed to the input tray. Since the sheet-like document is firmly clamped by the pick-up roller assembly and the separation slice of the input tray, the user usually fails to pull out the sheet-like document. For removing the jammed document, the upper cover above the input sheet should be opened. During the upper cover is opened, the pick-up roller assembly is gradually distant from the input tray. Until the upper cover is fully opened, the pick-up roller assembly is separated from the input tray and thus the sheet-like document is no longer clamped by the pick-up roller assembly. Consequently, the user is able to remove the jammed document from the sheet-feeding scanning apparatus without difficulty.

Generally, the sheet-feeding scanning apparatus with the automatic document feeder can scan general size of documents (e.g. A4-sized or Letter-sized documents) and thus the gap between the transfer roller assemblies thereof is designed to accommodate general size of documents. Since the business card has a size smaller than the general documents (also referred as ordinary documents in this context), the business card fed by the first transfer roller assembly fails to be nipped by the second transfer roller assembly and is usually stayed between these two transfer roller assemblies. In other words, the sheet-feeding scanning apparatus with the automatic document feeder is not applicable to scan business cards. Moreover, since the business card is relatively thicker than the general documents, the bending degree of the business card during transportation is usually insufficient.

Recently, an exclusive business card scanner is disclosed in for example in U.S. Pat. No. 5,604,640. This exclusive business card scanner, however, can scan only a single business card at a time. As previously described, the upper cover of the conventional sheet-feeding scanning apparatus can be uplifted to remove the jammed document. On the other hand, since the upper cover of this exclusive business card scanner is integrally formed on the main body thereof, the upper cover fails to be uplifted. Under this circumstance, the problem of causing jammed document is difficult to be dealt with.

Therefore, there is a need of providing a sheet-feeding scanning apparatus capable of feeding business cards and releasing a jam event so as to obviate the drawbacks encountered from the prior art.

SUMMARY OF THE INVENTION

It is an object of the present invention to provide an automatic sheet-feeding scanning apparatus for feeding a business card or an ordinary document.

Another object of the present invention provides an automatic sheet-feeding scanning apparatus having a mechanism for releasing the jammed business card.

In accordance with an aspect of the present invention, there is provided a sheet-feeding scanning apparatus having a business card feeding mechanism. The sheet-feeding scanning apparatus is adapted for scanning an image of an ordinary document or a business card. The sheet-feeding scanning apparatus includes a scanning module, an ordinary document input tray, an ordinary document pick-up roller assembly, an ejecting tray, a transfer channel, a plurality of transfer roller assemblies, a business card input tray, and a business card pick-up roller assembly. The scanning module is disposed within a scan region for scanning the image of the ordinary document or the business card. The ordinary document input tray is arranged at one side of the scanning module for placing the ordinary document thereon. The ordinary document pick-up roller assembly is used for feeding the ordinary document on the ordinary document input tray into an internal portion of the sheet-feeding scanning apparatus. The ejecting tray is used for supporting the ordinary document or the business card after being scanned. The transfer channel is arranged between the ordinary document input tray and the scan region for leading the ordinary document. The transfer roller assemblies are used for transporting the ordinary document. The business card input tray is arranged at another side of the scanning module, and includes a business card support plate, a jam-releasing button and a separation slice. The business card is placed on the business card support plate. The jam-releasing button is connected to the business card support plate. The separation slice offers a friction force on the business card. When the jam-releasing button is pressed down by a user, the jam-releasing button is swung. The business card pick-up roller assembly is fixed on the business card input tray for feeding the business card on the business card input tray. If the business card on the business card input tray is transported by the business card pick-up roller assembly and no jam event occurs, the jam-releasing button is unnecessarily pressed down and the business card support plate is separated from the separation slice, so that the business card input tray is in a feeding status. If the business card on the business card input tray is transported by the business card pick-up roller assembly but a jam event occurs, the jam-releasing button is pressed down to have the business card support plate swing toward the bottom of the business card input tray. Under this circumstance, the business card support plate is sustained against the separation slice to increase a gap between the business card pick-up roller assembly and the separation slice, and the business card input tray is in a jam-releasing status for facilitating removing the jammed business card.

In an embodiment, the business card pick-up roller assembly includes a business card pick-up roller and a business card separation roller. The business card pick-up roller is used for feeding the business card into the transfer channel. The business card separation roller is used for offering a friction force on the business card such that only one business card is fed into the transfer channel by the business card pick-up roller assembly for each time.

In an embodiment, the business card pick-up roller assembly comprises a shaft rod, which is sheathed by the business card pick-up roller. Ends of the shaft rod extend into slots formed in the business card input tray, such that the business card pick-up roller assembly is coupled to the business card input tray through the shaft rod.

In an embodiment, the business card support plate further comprises a recess. The jam-releasing button further comprises a protrusion to be inserted into the recess such that the jam-releasing button is connected to the business card support plate.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
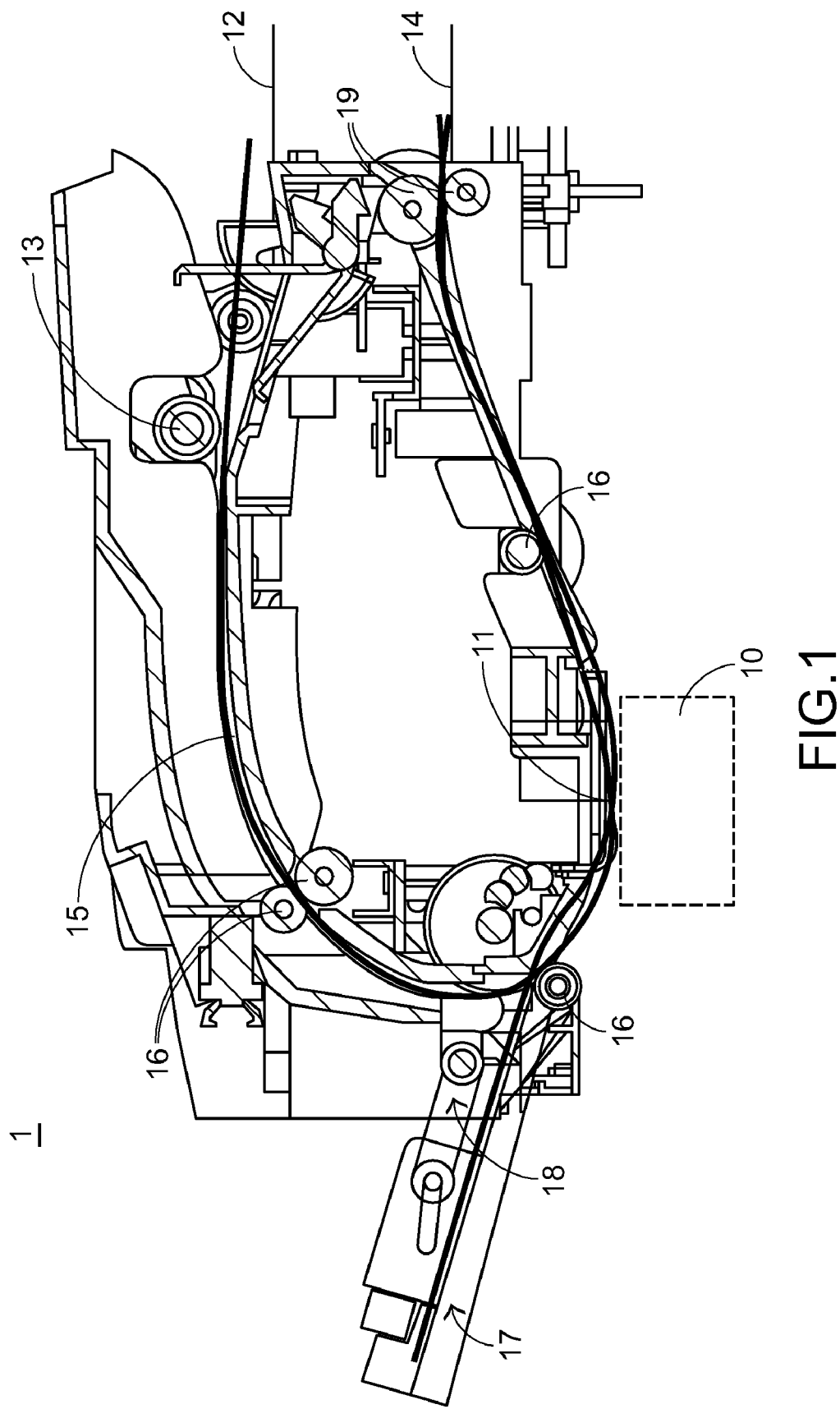
FIG. 1 is a schematic view illustrating a scanning path of a scanning apparatus according to a preferred embodiment of the present invention.

FIG. 1 is a schematic cross-sectional view illustrating a sheet-feeding scanning apparatus having a business card feeding mechanism according to a preferred embodiment of the present invention. As shown in FIG. 1, the sheet-feeding scanning apparatus 1 principally comprises a scanning module 10, an ordinary document input tray 12, an ordinary document pick-up roller assembly 13, an ejecting tray 14, a transfer channel 15, several transfer rollers 16, an ejecting roller assembly 19, a business card input tray 17 and a business card pick-up roller assembly 18. The scanning module 10 is disposed within a scan region 11 for scanning the image of ordinary documents (not shown) or business cards (not shown). With the scanning module 10 serving as a reference point, the ordinary document input tray 12 is arranged at one side of the scanning module 10 for placing thereon the ordinary documents to be scanned; and the business card input tray 17 is arranged at another side of the scanning module 10. The ordinary document pick-up roller assembly 13 is disposed in the vicinity of the ordinary document input tray 12 for feeding the ordinary documents on the ordinary document input tray 12 into the internal portion of the sheet-feeding scanning apparatus 1. The ejecting tray 14 is arranged below the ordinary document input tray 12 for supporting thereon the ordinary documents or the business cards after being scanned by the scanning module 10. The ejecting roller assembly 19 is used for transporting the scanned ordinary documents or the scanned business cards to the ejecting tray 14. The transfer channel 15 is arranged between the ordinary document input tray 12 and scan region 11 for leading the ordinary documents or the business cards to the scan region 11. The transfer rollers 16 are arranged in the transfer channel 15 for transporting the ordinary documents or the business cards through the transfer channel 15.

Hereinafter, the process of scanning ordinary documents by using the sheet-feeding scanning apparatus of the present invention will be illustrated with reference to FIG. 1. First of all, the ordinary documents to be scanned are placed on the ordinary document input tray 12. For scanning the ordinary documents, the ordinary documents are successively fed into the transfer channel 15 by the ordinary document pick-up roller assembly 13. Next, the ordinary documents are transported in the transfer channel 15 by the transfer rollers 16 to the scan region 11. When the ordinary documents are transported across the scan region 11, the scanning module 10 reads the images of these ordinary documents. After the ordinary documents are scanned by the scanning module 10, the ordinary documents are transported by the transfer roller 16 which is arranged between the scan region 11 and the ejecting tray 14 to the ejecting roller assembly 19. Next, the ordinary documents are transported by the ejecting roller assembly 19 and thus exited to the ejecting tray 14. Meanwhile, the scanning operations on the ordinary documents are completed.

Figure 2:
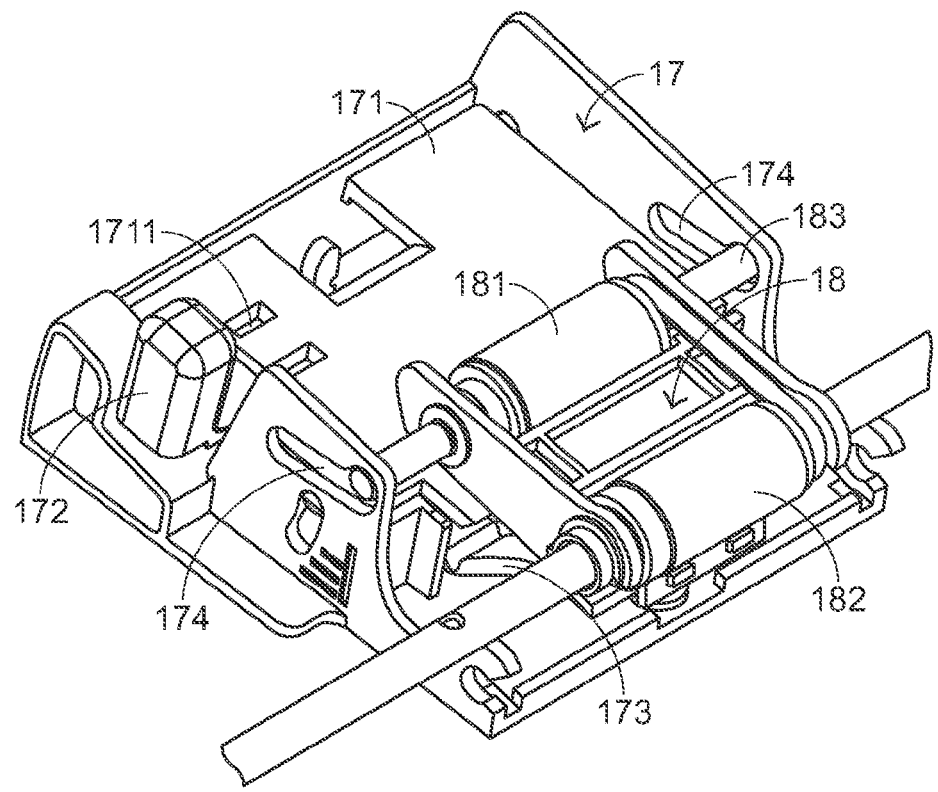
FIG. 2 is a schematic perspective view illustrating an exemplary business card feeding mechanism of the sheet-feeding scanning apparatus according to the present invention.

FIG. 2 is a schematic perspective view illustrating an exemplary business card feeding mechanism of the sheet-feeding scanning apparatus according to the present invention. Hereinafter, the process of scanning business cards by using the sheet-feeding scanning apparatus of the present invention will be illustrated with reference to FIG. 2. As shown in FIG. 2, the business card feeding mechanism comprises the business card input tray 17 and the business card pick-up roller assembly 18.

Figure 3:
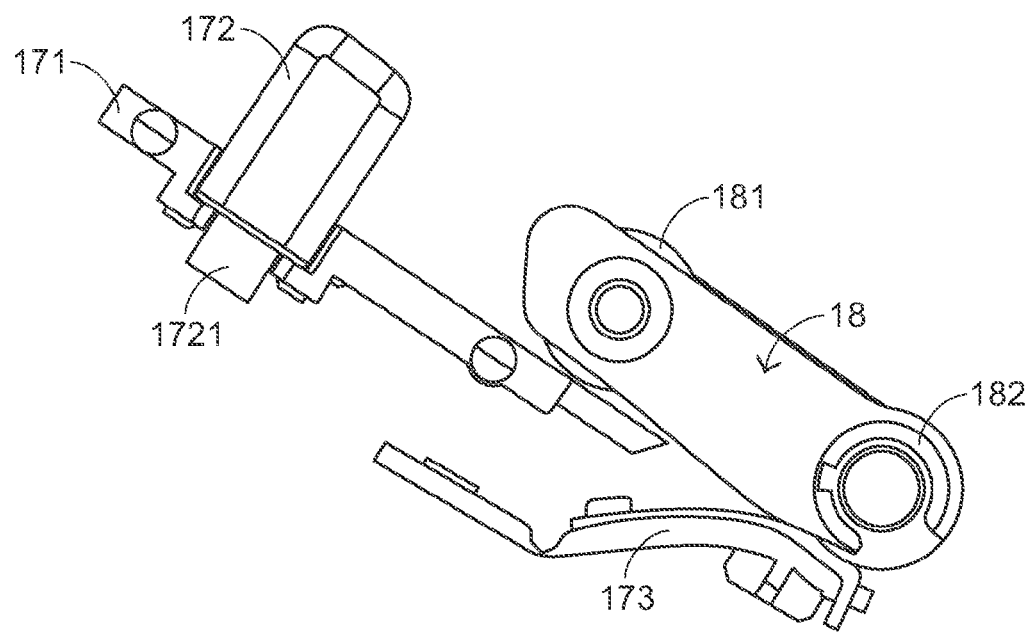
FIG. 3 is a schematic side view illustrating the business card input tray of the sheet-feeding scanning apparatus in a feeding status.

The business card input tray 17 comprises a business card support plate 171, a jam-releasing button 172 and a separation slice 173. The business card support plate 171 is user for supporting the business cards thereon. The jam-releasing button 172 is connected to the business card support plate 171. When the jam-releasing button 172 is pressed down by the user, the business card support plate 171 is deformed and swung downwardly. The business card support plate 171 comprises a recess 1711. Corresponding to the recess 1711, the jam-releasing button 172 comprises a protrusion 1721 (as shown in FIG. 3). The protrusion 1721 of the jam-releasing button 172 is inserted into the recess 1711 such that the jam-releasing button 172 is connected to the business card support plate 171. The business card pick-up roller assembly 18 is fixed on the business card input tray 17 for feeding the business cards placed on the business card input tray 17 into the internal portion of the sheet-feeding scanning apparatus 1. The business card pick-up roller assembly 18 comprises a business card pick-up roller 181, a business card separation roller 182 and a shaft rod 183. The business card pick-up roller 181 may feed the business cards into the transfer channel 15 (as shown in FIG. 1). When the business card separation roller 182 is contacted with the business cards, the business card separation roller 182 and the separation slice 173 offer friction forces on the business cards such that only one business card is separated from the stack of business cards and allowed to be fed by the business card pick-up roller assembly 18 into the transfer channel 15 for each time. The shaft rod 183 is sheathed by the business card pick-up roller 181 of the business card pick-up roller assembly 18. Ends of shaft rod 183 extend into slots 174 of business card input tray 17 such that the business card pick-up roller assembly 18 is coupled to the business card input tray 17 through the shaft rod.

In accordance with a feature of the present invention, the friction forces resulted from the business cards, the separation slice 173 and the business card separation roller 182 should be elaborately controlled. It is preferred that the frictional force u3 between the business card and the business card separation roller 182 is greater than the frictional force u1 between the business card and the separation slice 173, and the frictional force u1 is greater than the frictional force u2 between the business cards.

The procedure of feeding the business cards by the sheet-feeding scanning apparatus 1 will be illustrated with reference to FIGS. 1 and 3. FIG. 3 is a schematic side view illustrating the business card input tray of the sheet-feeding scanning apparatus in a feeding status. In a case that the sheet-feeding scanning apparatus 1 is operated in a business card scanning mode, the business card input tray 17 is opened (as shown in FIG. 1). Next, the business cards (not shown) to be scanned by the sheet-feeding scanning apparatus 1 are placed on the business card support plate 171 of the business card input tray 17. The business card support plate 171 and the separation slice 173 are contacted with the business card pick-up roller assembly 18 but the business card support plate 171 is separated from the separation slice 173. Under this circumstance, the business card input tray 17 is in the feeding status, as is shown in FIG. 3.

For scanning the business cards, the business cards on the business card input tray 17 are one by one transported by the business card pick-up roller assembly 18. During transportation of the business cards, the separation slice 173 is slightly separated from the business card pick-up roller assembly 18 such that a gap is defined between the separation slice 173 and the business card pick-up roller assembly 18. Consequently, the business cards are transported across the gap and then fed into the transfer channel 15. After the first business card is fed into the transfer channel 15, the first business card is transported to the scan region 11 by the transfer rollers 16 arranged in the transfer channel 15. When the first business card is transported across the scan region 11, the scanning module 10 reads the image of the first business card. After the first business card is scanned by the scanning module 10, the first business card is transported by the transfer roller 16 which is arranged between the scan region 11 and the ejecting tray 14 to the ejecting roller assembly 19. Meanwhile, the scanning operation on the first business card is completed.

During operation of the sheet-feeding scanning apparatus, if a jam event occurs, the business card is stuck in the gap between the business card pick-up roller assembly 18 and the separation slice 173. Since the business card pick-up roller assembly 18 is coupled to the business card input tray 17, it is difficult to release the jam event by separating the card pick-up roller assembly 18 from the business card input tray 17. On the basis of the specified design of the business card input tray 17 and the business card pick-up roller assembly 18, the jam-releasing button 172 arranged on the business card support plate 171 of the business card input tray 17 may be used to release the jam event. If the jam event occurs, the user may press down the jam-releasing button 172 such that the business card support plate 171 is swung downwardly and then sustained against the separation slice 173. Under this circumstance, the business card input tray 17 is in a jam-releasing status (as shown in FIG. 4).

Figure 4:
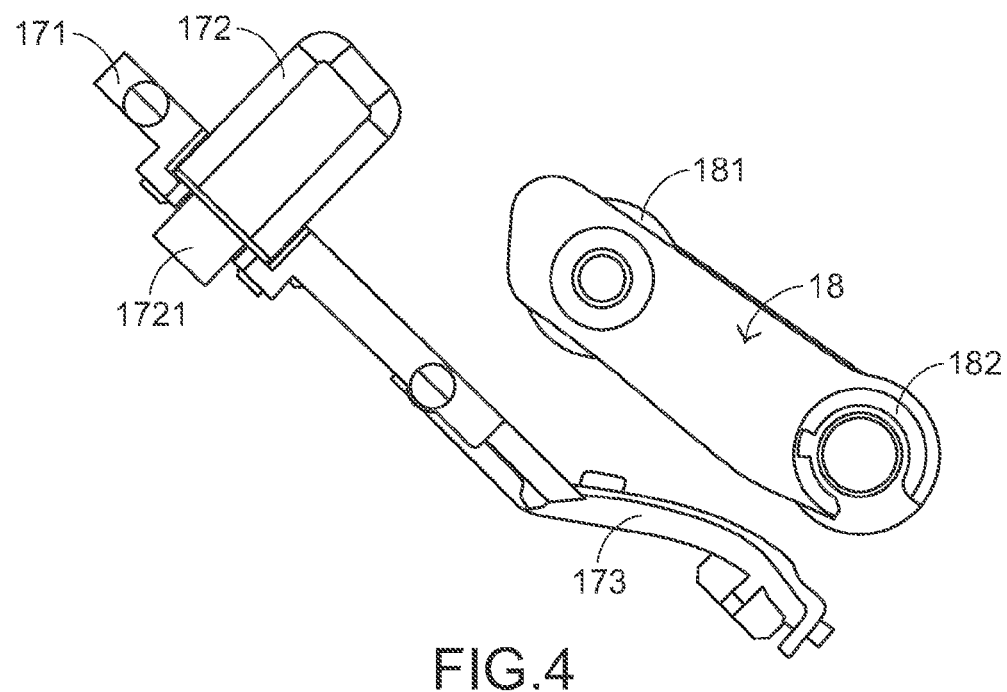
FIG. 4 is a schematic side view illustrating the business card input tray of the sheet-feeding scanning apparatus in a jam-releasing status.
Figure 5:
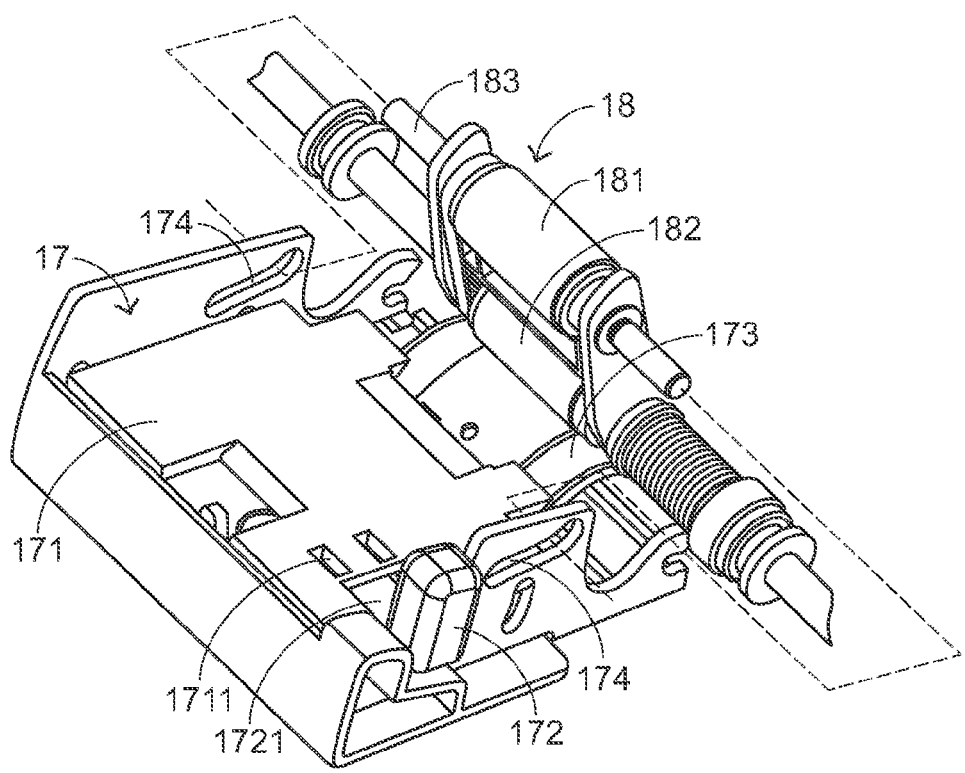
FIG. 5 is a schematic perspective view illustrating the business card input tray of the sheet-feeding scanning apparatus in the jam-releasing status.

FIG. 4 is a schematic side view illustrating the business card input tray of the sheet-feeding scanning apparatus in a jam-releasing status. As shown in FIG. 4, the business card pick-up roller assembly 18 maintains its position when the business card input tray is in the jam-releasing status. When the jam-releasing button 172 connected to the business card support plate 171 is pressed down, the business card support plate 171 is swung downwardly and sustained against the separation slice 173. As a consequence, the separation slice 173 is slightly subject to a downward shift and the gap between the business card pick-up roller assembly 18 and the separation slice 173 is increased. Under this circumstance, the business card clamped by the pick-up roller assembly 18 and the separation slice 173 is no longer clamped. Consequently, the user is able to remove the jammed business card from the sheet-feeding scanning apparatus without difficulty so as to release the jam even. Meanwhile, the sheet-feeding scanning apparatus returns to its normal scanning mode. FIG. 5 is a schematic perspective view illustrating the business card input tray of the sheet-feeding scanning apparatus in the jam-releasing status.

From the above description, since the sheet-feeding scanning apparatus of the present invention has a business card feeding mechanism, the sheet-feeding scanning apparatus can scan not only ordinary documents but also business cards. That is, the sheet-feeding scanning apparatus of the present invention can be used to scan ordinary documents or business cards. Since many business cards can be successively fed and scanned as electronic files by the sheet-feeding scanning apparatus of the present invention, the scanning speed is enhanced and the information associated with the business cards is effectively managed. Moreover, the business card input tray included in the business card feeding mechanism of the sheet-feeding scanning apparatus of the present invention is very simple in its structure. By pressing down the jam-releasing button, the user may remove the jammed business card so as to release the jam event. Due to the simply configuration, the sheet-feeding scanning apparatus of the present invention is very cost-effective and easy-use to release the jam event.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sheet-feeding scanning apparatus having a business card feeding mechanism, said sheet-feeding scanning apparatus being adapted for scanning an image of an ordinary document or a business card, and comprising:
a scanning module disposed within a scan region for scanning said image of said ordinary document or said business card;
an ordinary document input tray arranged at one side of said scanning module for placing said ordinary document thereon;
an ordinary document pick-up roller assembly for feeding said ordinary document on said ordinary document input tray into an internal portion of said sheet-feeding scanning apparatus;
an ejecting tray for supporting said ordinary document or said business card after being scanned;
a transfer channel arranged between said ordinary document input tray and said scan region for leading said ordinary document;
a plurality of transfer rollers for transporting said ordinary document;
a business card input tray arranged at another side of said scanning module, and comprising a business card support plate for placing said business card thereon, a jam-releasing button connected to said business card support plate, and a separation slice for offering a friction force on said business card, wherein said business card support plate is swung when said jam-releasing button is pressed down by a user; and
a business card pick-up roller assembly coupled to said business card input tray for feeding said business card on said business card input tray, wherein said business card pick-up roller assembly comprises:
a business card separation roller for offering a friction force on said business card such that only one business card at a time is fed into said transfer channel by said business card pick-up roller assembly; and
a shaft rod sheathed by a business card pick-up roller, wherein ends of said shaft rod engage said business card input tray such that said business card pick-up roller assembly is coupled to said business card input tray through said shaft rod,
wherein if said business card on said business card input tray is transported by said business card pick-up roller assembly and a jam event occurs, said jam-releasing button is pressed down to have said business card support plate swing toward the bottom of said business card input tray, so that said business card support plate is sustained against said separation slice to increase a gap between said business card pick-up roller assembly and said separation slice, and said business card input tray is in a jam-releasing status for facilitating removing said jammed business card.

2. The sheet-feeding scanning apparatus having a business card feeding mechanism according to claim 1 wherein said business card pick-up roller feeds said business card into said transfer channel.

3. The sheet-feeding scanning apparatus having a business card feeding mechanism according to claim 1 wherein said business card support plate further comprises a recess, and said jam-releasing button further comprises a protrusion to be inserted into said recess such that said jam-releasing button is connected to said business card support plate.

* * * * *